US012750759B2

(12) United States Patent
Yoon et al.

(10) Patent No.: US 12,750,759 B2
(45) Date of Patent: Sep. 29, 2026

(54) DETERMINING TIME OF ARRIVAL BASED ON PHASE MEASUREMENT

(71) Applicant: Nokia Technologies Oy, Espoo (FI)

(72) Inventors: Daejung Yoon, Nozay (FR); Jorge Morte Palacios, Tampere (FI); Satya Krishna Joshi, Oulu (FI)

(73) Assignee: Nokia Technologies Oy, Espoo (FI)

(*) Notice: Subject to any disclaimer, the term of this patent is extended or adjusted under 35 U.S.C. 154(b) by 385 days.

(21) Appl. No.: 18/293,449

(22) PCT Filed: Aug. 13, 2021

(86) PCT No.: PCT/EP2021/072604
§ 371 (c)(1),
(2) Date: Jan. 30, 2024

(87) PCT Pub. No.: WO2023/016654
PCT Pub. Date: Feb. 16, 2023

(65) Prior Publication Data
US 2024/0284297 A1 Aug. 22, 2024

(51) Int. Cl.
*H04W 40/08* (2009.01)
*H04L 5/00* (2006.01)
*H04W 64/00* (2009.01)

(52) U.S. Cl.
CPC ........... *H04W 40/08* (2013.01); *H04L 5/0007* (2013.01); *H04L 5/0051* (2013.01); *H04W 64/00* (2013.01)

(58) Field of Classification Search
CPC .... H04W 40/08; H04W 64/00; H04L 5/0007; H04L 5/0051; H04L 27/2672; H04L 27/2675; H04L 27/2663; G01S 5/0236; G01S 5/0036; G01S 5/0205; G01S 5/10; H04B 1/1027
See application file for complete search history.

(56) References Cited

U.S. PATENT DOCUMENTS

| | | | |
|---|---|---|---|
| 10,623,121 | B1 | 4/2020 | Satrasala et al. |
| 10,656,241 | B2 | 5/2020 | Ryden et al. |
| 11,082,854 | B2 | 8/2021 | Marquez et al. |
| 2019/0090092 | A1 | 3/2019 | Hwang et al. |
| 2021/0124006 | A1 | 4/2021 | Sheng et al. |

(Continued)

FOREIGN PATENT DOCUMENTS

| | | | |
|---|---|---|---|
| CN | 101529840 | A | 9/2009 |
| CN | 101606076 | A | 12/2009 |
| CN | 109565424 | A | 4/2019 |

(Continued)

OTHER PUBLICATIONS

"3rd Generation Partnership Project; Technical Specification Group Radio Access Network; LTE Positioning Protocol (LPP) (Release 16)", 3GPP TS 37.355, V16.4.0, Mar. 2021, pp. 1-298.

(Continued)

*Primary Examiner* — Nizam U Ahmed
(74) *Attorney, Agent, or Firm* — Barta Jones, PLLC

(57) ABSTRACT

A method can include determining that a received signal traveled via a shortest path from a transmitting device to a receiving device of an orthogonal frequency-divisional multiplexing (OFDM) communication system, determining a phase rotation of the received signal, and determining a time of arrival based on the determined phase rotation.

20 Claims, 9 Drawing Sheets

(56) References Cited

U.S. PATENT DOCUMENTS

2022/0159415 A1* 5/2022 Khoryaev ............ H04W 64/00

FOREIGN PATENT DOCUMENTS

| | | | |
|---|---|---|---|
| EP | 3609021 | A1 | 2/2020 |
| WO | 2008/080450 | A1 | 7/2008 |
| WO | 2020/091686 | A1 | 5/2020 |

OTHER PUBLICATIONS

"3rd Generation Partnership Project; Technical Specification Group Radio Access Network; NG-RAN; NR Positioning Protocol A (NRPPa) (Release 16)", 3GPP TS 38.455, V16.3.0, Apr. 2021, pp. 1-151.

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.4.0, Mar. 2021, pp. 1-119.

Dun et al., "Design of Sparse Multiband Signal for Precise Positioning With Joint Low-Complexity Time Delay and Carrier Phase Estimation", IEEE Transactions on Vehicular Technology, vol. 70, No. 04, Apr. 2021, pp. 3552-3567.

"Views on potential enhancements for NLOS mitigation in Rel-17 positioning", 3GPP TSG RAN WG1 #105-e, R1-2105109, Agenda: 8.5.5, Apple Inc., May 10-27, 2021, pp. 1-3.

"FL Summary for Potential Positioning Enhancements", 3GPP TSG RAN WG1 Meeting #103-e, R1-2009314, Agenda: 8.5.3, CATT, Oct. 26-Nov. 13, 2020, 60 pages.

International Search Report and Written Opinion received for corresponding Patent Cooperation Treaty Application No. PCT/EP2021/072604, dated Apr. 19, 2022, 12 pages.

Dun et al., "Positioning in a Multipath Channel Using OFDM Signals With Carrier Phase Tracking", IEEE Access, vol. 08, 2020, pp. 13011-13028.

Makki et al., "High-resolution time of arrival estimation for OFDM-based transceivers", Electronic Letters, vol. 51, No. 03, Feb. 5, 2015, pp. 294-296,.

"3rd Generation Partnership Project; Technical Specification Group Radio Access Network; NR; Physical layer procedures for data (Release 18)", 3GPP TS 38.214, V18.0.0, Sep. 2023, pp. 1-278.

Office action received for corresponding Chinese Patent Application No. 202180101471.X, dated Apr. 18, 2026, 16 pages of office action and 2 pages of translation available.

* cited by examiner

DETERMING TIME OF ARRIVAL BASED ON PHASE MEASUREMENT

RELATED APPLICATION

This application was originally filed as a Patent Cooperation Treaty Application No. PCT/EP2021/072604 filed on Aug. 13, 2021, which is hereby incorporated by reference in its entirety.

TECHNICAL FIELD

This description relates to wireless communications.

BACKGROUND

In wireless communication systems, it can be helpful for nodes, such as base stations, to have information regarding the locations regarding other nodes, such as user equipments. The information regarding locations can be helpful for scheduling transmissions.

SUMMARY

According to an example, a method can include determining that a received signal traveled via a shortest path from a transmitting device to a receiving device of an orthogonal frequency-divisional multiplexing (OFDM) communication system, determining a phase rotation of the received signal, and determining a time of arrival based on the determined phase rotation.

According to an example, a non-transitory computer-readable storage medium comprising instructions stored thereon. When executed by at least one processor, the instructions can be configured to cause a computing system to determine that a received signal traveled via a shortest path from a transmitting device to a receiving device of an orthogonal frequency-divisional multiplexing (OFDM) communication system, determine a phase rotation of the received signal, and determine a time of arrival based on the determined phase rotation.

According to an example, a computing system can include at least one processor, and a non-transitory computer-readable storage medium comprising instructions stored thereon. When executed by the at least one processor, the instructions can be configured to cause a computing system to determine that a received signal traveled via a shortest path from a transmitting device to a receiving device of an orthogonal frequency-divisional multiplexing (OFDM) communication system, determine a phase rotation of the received signal, and determine a time of arrival based on the determined phase rotation.

The details of one or more implementations are set forth in the accompanying drawings and the description below. Other features will be apparent from the description and drawings, and from the claims.

DETAILED DESCRIPTION

This disclosure describes a method of determining a time of arrival of a signal based on a measured phase rotation of a received signal. The received signal can be a signal that traveled from a transmitting device to a receiving device via a shortest path in an orthogonal frequency-division multiplexing (OFDM) system. The signal can be determined to travel via a shortest path based on exhibiting flat fading in a frequency domain. In some examples, the transmitting device can be a base station and the receiving device can be a user equipment. In some examples, the transmitting device can be the user equipment and the receiving device can be the base station.

The phase rotation of the received signal can be determined in a frequency domain. The determination of the time of arrival, and/or time delay between transmitting and receiving, the signal, based on the measurement of the phase rotation, can result in a low complexity baseband modem structure for positioning measurements.

Figure 1:
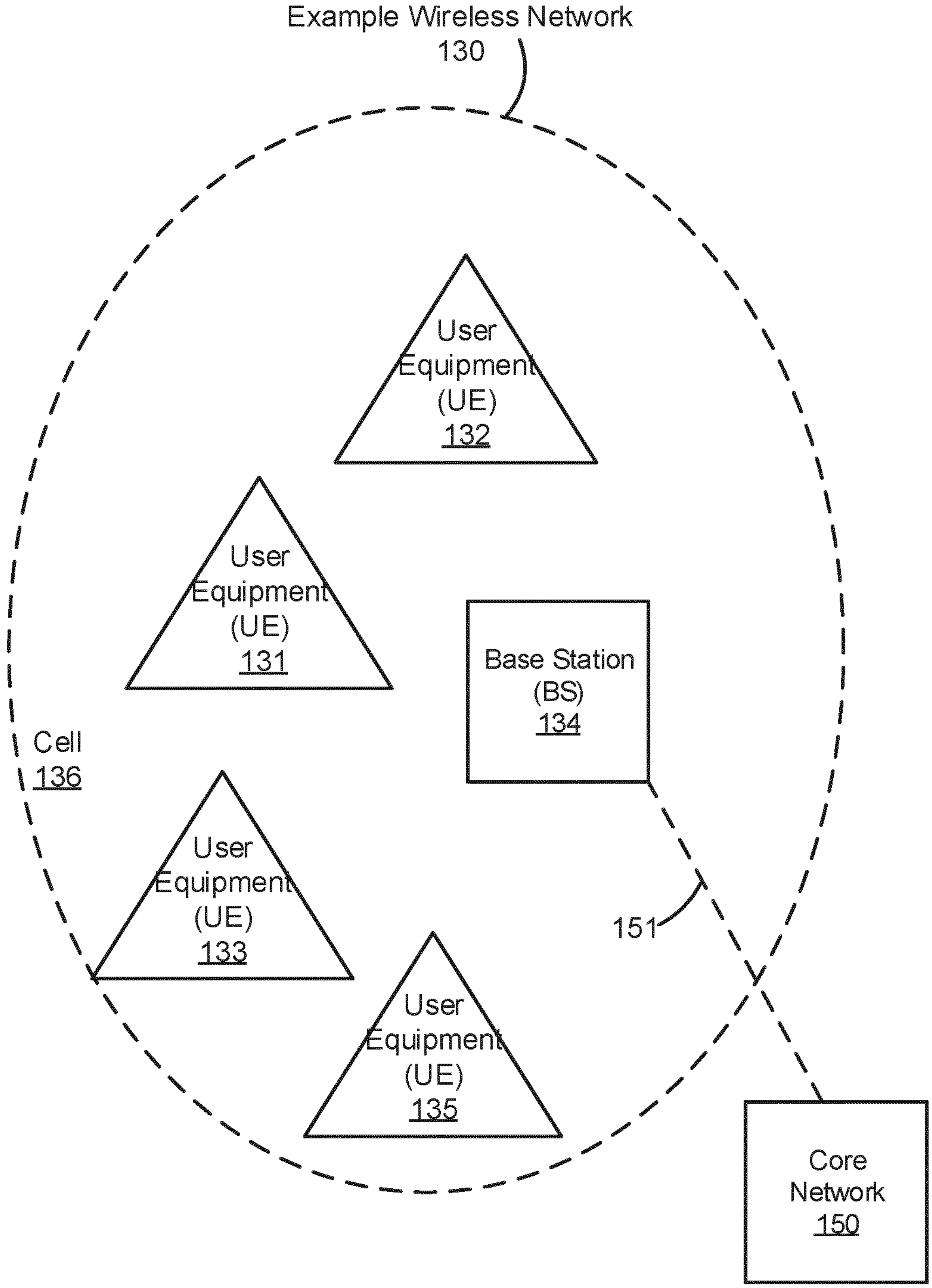
FIG. 1 is a block diagram of a wireless network according to an example embodiment.

FIG. 1 is a block diagram of a wireless network 130 according to an example embodiment. In the wireless network 130 of FIG. 1, user equipments 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), or a next generation Node B (gNB). The terms user device and user equipment (UE) may be used interchangeably. A base station 134 may also be referred to as a gNB (next-generation Node B), a RAN (radio access network) or NG-RAN (next generation radio access network) node. At least part of the functionalities of a base station (e.g., access point, next generation Node B, enhanced Node B, radio access network node) may also be carried out by one or more network nodes, servers or hosts, such as a centralized unit (CU) and a distributed unit (DU) in a split RAN architecture, which may be operably coupled to a remote transceiver, such as a remote radio head (RRH). Base station 134 provides wireless coverage within a cell 136, including to user equipments 131, 132, 133 and 135. Although only four user equipments are shown as being connected to, attached to, or served by serving base station 134, any number of user devices may be provided. Base station 134 is also connected to a core network 150 via a S1 interface 151. This is merely one simple example of a wireless network, and others may be used.

According to an illustrative example, a base station (e.g., access point, next generation Node B, enhanced Node B, radio access network node) may be part of a mobile telecommunication system. A radio access network may include one or more radio access nodes (e.g., AP, BSs, eNBs, gNBs) that implement a radio access technology, e.g., to allow one or more user equipments to have access to a network or core network. Thus, the radio access network nodes reside between one or more user devices or user equipments and a core network. According to an example embodiment, each radio access network node may provide one or more wireless communication services for one or more user equipments or user devices, e.g., to allow the user equipments to have wireless access to a network, via the radio access network node. Each radio access network node may perform or provide wireless communication services, e.g., such as allowing user equipments or user devices to establish a wireless connection to the radio access network node, and sending data to and/or receiving data from one or more of the user equipments. For example, after establishing a connection to a user equipment, a radio access network node may forward data to the user equipment that is received from a network or the core network, and/or forward data received from the user equipment to the network or core network. Radio access network nodes may perform a wide variety of other wireless functions or services, e.g., such as broadcasting control information (e.g., such as system information) to user equipments, paging user equipments when there is data to be delivered to the user equipment, assisting in handover of a user equipment between cells, scheduling of resources for uplink data transmission from the user equipment(s) and downlink data transmission to user equipment(s), sending control information to configure one or more user equipment, and the like. These are a few examples of one or more functions that a radio access network node may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, or a wearable device, as examples, or any other wireless device. It should be appreciated that a user device may also be (or may include) a nearly exclusive uplink-only device, of which an example is a camera or video camera loading images or video clips to a network.

Core network 150 may include a mobility management entity (MME) or an access and mobility management function (AMF), which may control access to the network, and handle or assist with mobility/handover of user devices between base stations, one or more gateways that may forward data between the base stations and a packet data network or the Internet, and other control nodes, functions or blocks. The core network 150 may include a location management function (LMF). The location management function can include a positioning control entity in the core network 150. The location management function can receive positioning reference signals from user equipments 131, 132, 133, 135 and/or the base station 134 and determine locations of the user equipments 131, 132, 133, 135 based on the positioning reference signals. A location management function can also be referred to as a location management component (LMC).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor-type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

The various example embodiments may be applied to a wide variety of wireless technologies or wireless networks, such as LTE, LTE-A, 5G/New Radio (NR), or any other wireless network or wireless technology operating on cmWave and/or mmWave bands, and to a wide variety of communication services, such as IoT, MTC, eMTC, eMBB, URLLC, etc. These example networks, technologies or data service types are provided only as illustrative examples.

In some cases, a UE positioning session (or positioning procedure) may be used to determine a location or geographic position of a user equipment (or mobile device) or of an asset that is being tracked. In some examples, user equipment positioning may be performed or determined based on positioning signals, such as positioning reference signals (PRSs), sounding reference signals (SRSs), or other reference signals. Positioning reference signals may include any signals that may be used to determine or estimate a position of a user equipment, node or object. Downlink positioning reference signals (PRSs) and uplink (UL) sounding reference signals (SRSs) are examples of positioning reference signals, and other positioning reference signals may be used. Some example positioning procedures may include Time Difference of Arrival (TDOA), such as downlink-TDOA (DL-TDOA), DL (downlink) Angle of Departure (DL-AoD), multiround trip time (multi-RTT) positioning, or other positioning or location techniques. Applications or use cases may exist or arise where the network may track a location of a user equipment(s) or asset. As part of a positioning procedure, a user equipment, or other device, may measure and report measured signal parameter(s) of positioning reference signals (e.g., downlink positioning reference signals), to allow a network to track the user equipment's (and thus the asset's) location (or position). There may exist applications or uses where it may be useful to track a (e.g., geographic) position of an asset, such as tracking a position of a valuable object, tracking a package or container shipment, employee badge tracking, etc.

As noted, a positioning reference signal may be, or may include, any signal (e.g., any positioning signal, or any reference signal) that may be used, or may be capable of being used (e.g., based on one or more signal measurements of such positioning signal), to measure or estimate a location of a user equipment or other object. There may be (or may exist) downlink (DL) positioning signals (e.g., DL positioning reference signals (PRS) signals) transmitted by a network node (e.g., gNB) to a user equipment, and there may be uplink (UL) positioning signals (e.g., such as a sounding reference signals (SRS)) transmitted by a user equipment to other nodes (such as to one or more gNBs or network nodes), which may be used, as part of a positioning session (or positioning occasion or positioning procedure), to determine a position of a user equipment (or other node, device or object). These are example positioning signals, and other positioning signals may be used.

For example, based on received downlink positioning reference signals (e.g., based on DL PRS signals), a user equipment may measure one or more signal parameters (e.g., phase and/or amplitude, or other signal parameter) of a received downlink positioning reference signal from each of multiple positioning signal sources (e.g., from multiple gNBs), and then the user equipment may determine (or estimate) its own position (or location) based on the signal measurements and known locations of the positioning signal sources (or locations of the gNBs). The user equipment may then forward its estimated position to its serving gNB, or to a location entity such as a location management function (LMF), which may be provided on a network node, on a node in the cloud, or within a core network. Alternatively, the user equipment may forward its signal measurements (measurements of phase or other signal parameters of received DL positioning signals) to a serving gNB and/or to the LMF, where the gNB and/or LMF may then determine the user equipment's position based on these signal measurements. Also, for example, based on a request for user equipment position (e.g., by an application or another node), the LMF may initiate or request a positioning session for the user equipment (e.g., in order to obtain a position of the user equipment, or to obtain signal measurements that may be used by the LMF to determine the user equipment position). The LMF may determine or estimate the user equipment's position based on the received signal parameters or signal measurements, or the LMF may receive the user equipment position as estimated by the user equipment. The LMF may, for example, report or send the user equipment's position to a requesting node or application (e.g., to the serving gNB, a neighbor gNB, or an application running on a node or device within a network, which may have requested a position of the user equipment). Different positioning sessions, and/or different applications or nodes that may have requested a position of a user equipment, may have different positioning requirements, e.g., in terms of positioning accuracy, latency, and the like.

In the uplink direction, for example, a user equipment may transmit sounding reference signals (SRS) to multiple gNBs, and where multiple gNBs may perform signal measurements (e.g., phase and/or amplitude measurements) on the received SRS signals. The gNBs may then forward their signal measurements to the LMF, where the LMF may determine or estimate the user equipment's position.

According to an example embodiment, rather than having a gNB (or a user equipment) continuously or periodically transmit positioning signals, positioning signals may be provided or transmitted on-demand (or upon request). Based on the use of beamforming transmissions within 5G/NR, positioning reference signals may also be transmitted in the direction where there is at least one receiving node (e.g., user equipment or gNB) which will receive and process them for deriving the position (location) of the user equipment (either at the user equipment itself or at the network side after the measurements are reported to the network). An on-demand positioning signal (ODPS) may include any positioning signal (e.g., PRS, SRS or other reference signal) that may be transmitted upon request or as needed for positioning. Thus, on-demand positioning signals (ODPS) may include, for example, on-demand positioning reference signals (ODPRS), or on-demand sounding reference signals (ODSRS), or any other positioning or reference signal that may be transmitted upon request or as needed for positioning.

In NR/5G, signals may be transmitted directionally using beamforming (using narrow beams in specific directions to enhance signal transmission range and coverage). Thus, positioning signals may also be transmitted in specific directions using beamforming. Thus, to avoid transmitting a positioning signal in all or multiple directions (using different beams), the transmission of on-demand positioning signals is a more resource-efficient approach.

Figure 2A:
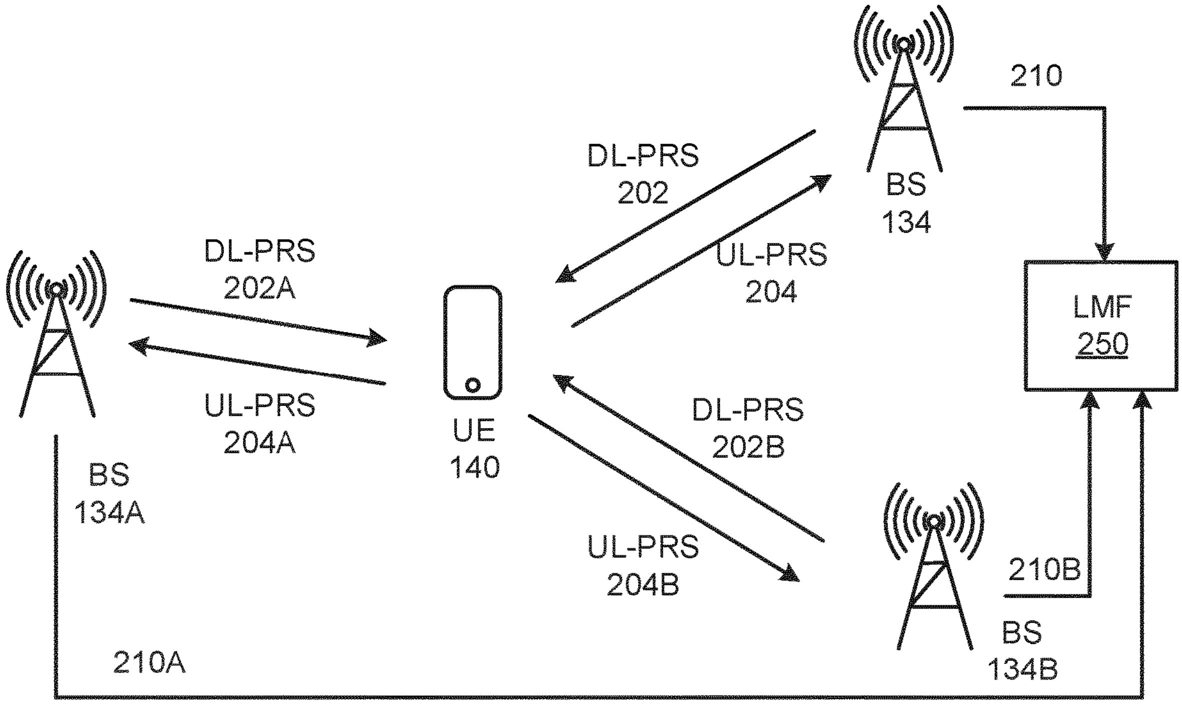
FIG. 2A is a network diagram showing positioning reference signals and time and angle measurements sent between a user equipment, base stations, and a location management function according to an example embodiment.

FIG. 2A is a network diagram showing positioning reference signals and time and angle measurements sent between a user equipment 140, base stations 134, 134A, 134B, and a location management function 250 according to an example embodiment. The user equipment 140 can be an example of the user equipments 131, 132, 133, 135 shown and described with respect to FIG. 1. The base stations 134, 134A, 134B can have similar features and/or functionalities to the base station 134 shown and described with respect to FIG. 1. In some examples, the base station 134 can be a serving base station, and/or a base station that is serving the user equipment 140, and the base stations 134A, 134B can be neighboring base stations. The location management function (LMF) 250 can be included in the core network 150.

In the example shown in FIG. 2A, the user equipment 140 can send and/or transmit uplink positioning reference signals (UL-PRS) 204, 204A, 204B to the base stations 134, 134A, 134B, and/or the base stations 134, 134A, 134B can receive uplink positioning reference signals (UL-PRS) 204, 204A, 204B from the user equipment 140. In the example shown in FIG. 2A, the base stations 134, 134A, 134B can send and/or transmit downlink positioning reference signals (DL-PRS) 202, 202A, 202B to the user equipment 140, and/or the user equipment 140 can receive downlink positioning reference signals (DL-PRS) 202, 202A, 202B from the base stations 134, 134A, 134B. The base stations 134, 134A, 134B can send and/or transmit, to the location management function 250, time and/or angle measurements 210, 210A, 210B. The time measurements can represent time of arrival and/or an amount of time it takes for a signal to travel between the user equipment 140 and one of the base stations 134, 134A, 134B. The angle measurement can represent a phase rotation of a signal sent between the user equipment 140 and one of the base stations 134, 134A, 134B. The phase rotation, which can also be considered a phase rotation, in combination with a frequency or period of the signal, can be used to determine the time of arrival of the signal.

When determining the delay and/or time of arrival, the user equipment 140 and/or base station 134, 134A, 134B can obtain raw channel estimates of multiple channels and/or multiple signals. In some examples, the user equipment 140 can determine times of arrival for multiple orthogonal frequency-divisional multiplexing (OFDM) symbols. In some examples, the user equipment 140 and/or base station 134, 134A, 134B can obtain raw channel estimates $\hat{h}_{raw,n,k}$ in the frequency domain as follows:

$$\hat{h}_{raw,n,k} = \hat{X}(n, k)conj(X(n, k))$$

where n represents symbol time index, and k represents frequency tone index. This frequency domain channel estimation can be limited to estimate average delay from a phase rotation ramp.

To ensure that the channel with the largest power is a line-of-sight channel (which can be considered to be a shortest path from a transmitting device to a receiving device in an orthogonal frequency-divisional multiplexing system), the user equipment and/or base station can report the flat frequency $F_{flat}$ to the location management function 250 as a line-of-sight indication flag, resulting in the location management function using the time of arrival measurements, and the user equipment and/or base station can report the time of arrival measurement to the location management function with an indicator and/or confirmation that the channel is a flat channel. The time delay and/or time of arrival can be further processed, such as by a phase wrapping process and line-of-sightbased time of arrival declaration process, for the user equipment and/or base station to report the time of arrival as a final time of arrival value.

After obtaining the raw channel estimates, the user equipment 140 and/or base station 134, 134A, 134B can determine whether each of the received signals and/or channels exhibits flat fading in a frequency domain. The user equipment 140 can determine a phase rotation of the received signal and/or channel that exhibits flat fading in the frequency domain. The flatness of frequency-domain channel represents a line-of-sight channel, which will have the largest energy at the first time delay tap in a time domain. The user equipment 140 and/or base station 134, 134A, 134B can determine whether each of the received signals and/or channels exhibits flat fading in a frequency domain by applying a channel flatness test. The channel flatness test can include setting a channel flatness flag based on counting the number of times a peak or range of the channel fading exceeds a channel threshold $H_{Threshold}$.

$$C_{fading} = \text{Count the number of ranges with } \text{abs}\left(\hat{h}_{raw,n,k}\right) > H_{Threshold} F_{flat} = \text{boolean}(C_{fading} < C_{threshold})$$

If the counter $C_{fading}$ is less than the threshold $C_{threshold}$ (i.e. the number of ranges $C_{fading}$ and/or ranges of the received signal amplitude, in a frequency domain, that exceed the channel threshold, is less than the flatness threshold $C_{threshold}$) then the channel is determined to be a fading channel and/or the shortest path from a transmitting device to a receiving device. In some examples, the shortest path can be in an orthogonal frequency-divisional multiplexing (OFDM) system. If the counter $C_{fading}$ is less than the threshold $C_{threshold}$ then the channel is determined to be a flat channel. A flat channel can be a channel that exhibits flat fading in a frequency domain, and/or a shortest path between a transmitting device and a receiving device. The channel determined to be the flat channel can be the channel for which the time of arrival and/or distance is determined. The time of arrival and/or distance can be determined based on a phase rotation of the flat channel (which can also be considered a phase rotation of the flat channel). The flatness of the channel ensures that the channel is a line-of-sight channel between the sending device and the receiving device.

Figure 2B:
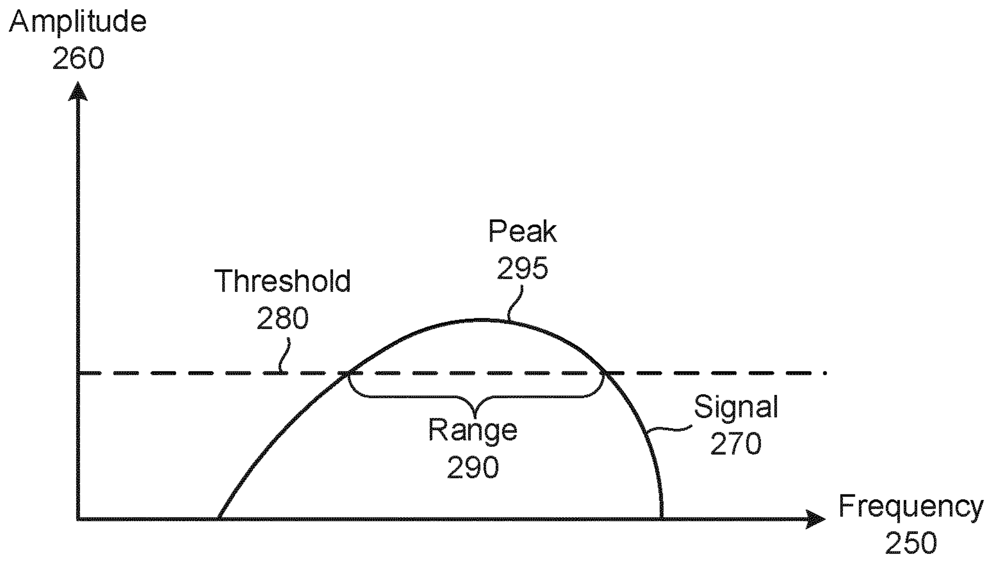
FIG. 2B shows an amplitude spectrum in a frequency domain according to an example embodiment.
Figure 2C:
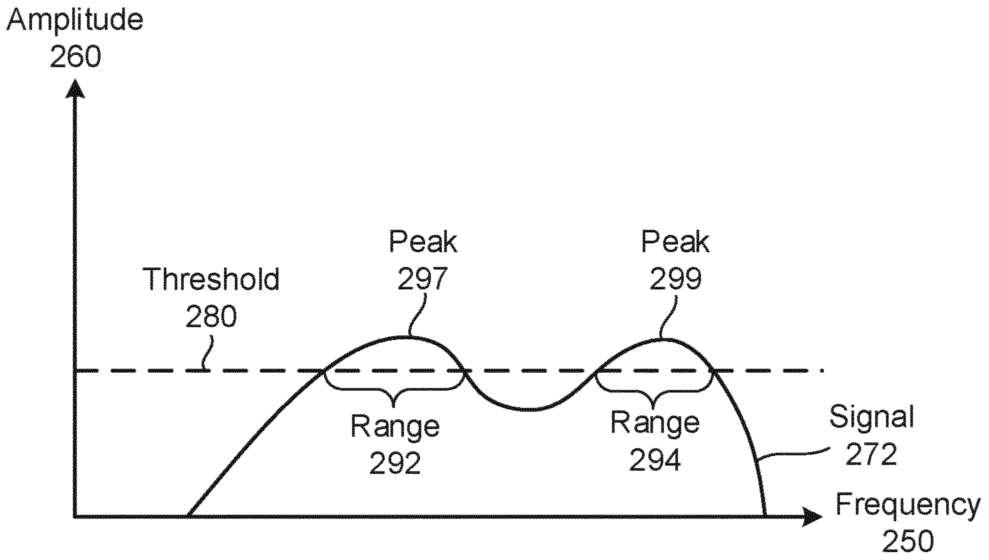
FIG. 2C shows an amplitude spectrum in a frequency domain according to another example embodiment.

FIGS. 2B and 2C show ranges that exceed the channel threshold $H_{Threshold}$.

FIG. 2B shows an amplitude spectrum in a frequency domain according to an example embodiment. In this example, the amplitude of the signal 270 exceeds the channel threshold $C_{threshold}$ for one range 290 that extends between the two points at which the amplitude of the signal 270 is equal to the threshold 280 ($H_{Threshold}$), and/or includes one peak 295 at which the amplitude of the signal 270 exceeds the threshold 280. In this example, $C_{fading}$ is equal to the number of ranges 290 and/or peaks 295, one.

FIG. 2C shows an amplitude spectrum in a frequency domain according to another example embodiment. In this example, the amplitude of the signal 272 exceeds the channel threshold $C_{threshold}$ for two ranges 292, 294 that extend between pairs of points at which the amplitude of the signal 270 is equal to the threshold 280 ($H_{Threshold}$), and/or includes two peaks 297, 299 at which the amplitude of the signal 270 exceeds the threshold 280. In this example, $C_{fading}$ is equal to the number of ranges 292, 294 and/or peaks 297, 299, two.

After determining whether the channel is the flat channel, the user equipment and/or base station can determine the phase rotation of the flat channel. In some examples, the user equipment and/or base station can send, to the location management function 250, a flat channel flag report indicating which channel is a flat channel. Determining the phase rotation can include computing an autocorrelation of the raw channel estimates along the frequency domain. In some examples, the user equipment and/or base station can compute the autocorrelation matrix $R_m$ according to the following equation:

$$R_m = \sum_{n}^{N_{sym}} \sum_{k}^{N_{RE}} \hat{h}_{raw,n,k} conj(\hat{h}_{raw,n,k-m})$$

where sym represents the number of orthogonal frequency-divisional multiplexing (OFDM) symbols, RE represents a number of resource elements in a frequency domain, $\hat{h}_{raw,n,k}$ is the raw channel estimate calculated above, and conj signifies calculating the conjugate of ($\hat{h}_{raw,n,k-m}$).

After calculating and/or computing the autocorrelation matrix $R_m$, the user equipment and/or base station can measure and/or determine a phase rotation from and/or of the autocorrelation matrix $R_m$. The user equipment and/or base station can measure and/or determine the phase rotation using a maximum separation, $S_{max}$, that tunes performance vs detectable time range, by calculating the following equations:

$$p = \prod_{s=1}^{S_{max}} R_s = e^{j2\pi T_{delay} \Delta f\left(\sum_{s=1}^{S_{max}} s\right)} + w$$

$$\theta_{PRS} = \frac{\text{angle}(p)}{\sum_{s=1}^{S_{max}} s}$$

where p represents a resource element calculated in the first equation, pi (II) represents a product of $R_s$ from the range of separations s=1 to $S_{max}$, $R_s$ represents the autocorrelation function (and is similar to $R_m$), $T_{delay}$ is the time delay of positioning reference signals, Δf represents the spacing between OFDM subcarriers, w represents a previously-known frequency spacing, $\theta_{PRS}$ represents the phase rotation in the frequency domain, $$\sum_{s=1}^{S_{max}} s$$

represents the sum of all the separation values and can represent a previously-known phase estimation, and where s represents a subcarrier spacing.

After the user equipment and/or base station measures and/or determines the phase rotation, the user equipment and/or base station can calculate the time delay of the positioning reference signal. In some examples, the user equipment 140 can determine the time of arrival by dividing the phase rotation by a subcarrier spacing between OFDM symbols. In some examples, the user equipment 140 can determine the time of arrival of the received signal based on the determined phase rotation based on the following equation:

$$T_{delay} = \frac{\theta_{PRS}}{2\pi \cdot \Delta f}$$

where $T_{delay}$ represents the time of arrival, $\theta_{PRS}$ represents the frequency domain phase rotation previously calculated and/or measured, and Δf represents the spacing between OFDM subcarriers.

The $T_{delay}$ measured and/or calculated by the user equipment and/or base station is relative to a beginning of a fast Fourier transformation (FFT) performed by the receiving user equipment and/or base station. This calculation relative to the beginning of the FFT assumes some course time synchronization and limits a maximum time delay so that a significant part of the OFDM symbol has to be within the FFT window. If the delay is positive, and/or the received signal arrives later than a beginning of an FFT, then inter-signal interference (ISI) is prevented.

The phase estimate alone can result in ambiguity regarding the time of arrival because the phase estimate does not include information regarding a number of full periods that the received signal may have rotated through. To resolve the ambiguity, the user equipment and/or base station can determine the time of arrival as a time of arrival within a predetermined estimate of the time of arrival that matches the phase rotation.

The user equipment and/or base station can perform phase wrapping to remove phase ambiguity from the range of the phase-based time of arrival estimation. The user equipment 140 can determine the time of arrival based on the determined phase rotation and a predetermined estimate of the time of arrival. In some examples, the predetermined estimate of the time of arrival can be an integer number of periods of the received signal.

With the above-described algorithm estimating a phase rotation between resource elements, the phase difference and/or phase rotation can be kept be between pi (Π), or one hundred eighty degrees (180°), and negative pi (−Π), or negative one hundred eighty degrees (−180°), to avoid phase ambiguities. This limitation on the phase difference and/or phase rotation limits the maximum time of arrival, or $T_{delay}$, to:

$$-\pi < \text{angle}(p_{ave}) < \pi$$

$$\frac{-1}{2 \cdot S_{max} \cdot \Delta f} < T_{delay} < \frac{1}{2 \cdot S_{max} \cdot \Delta f}$$

where $p_{ave}$ is an average phase rotation as calculated above, and the maximum sample delay $S_{max}$ calculated from the autocorrelation matrix $S_{max}$ and the spacing between OFDM subcarriers Δf were previously stored by the user equipment and/or base station. The maximum distance, measured in time ($T_{max}$) and distance ($d_{max}$) is limited to:

$$T_{max} = \frac{1}{2 \cdot S_{max} \cdot \Delta f}$$

$$d_{max} = \frac{1}{2 \cdot S_{max} \cdot \Delta f} \times c$$

where c is the speed of light. The user equipment 140 is synchronized with the serving base station 134. With the estimated delay, $T_{delay}$, relative to the fast Fourier transform (FFT) window, the calculated delay, $T_{delay,1}$, will be relatively small.

Figure 3:
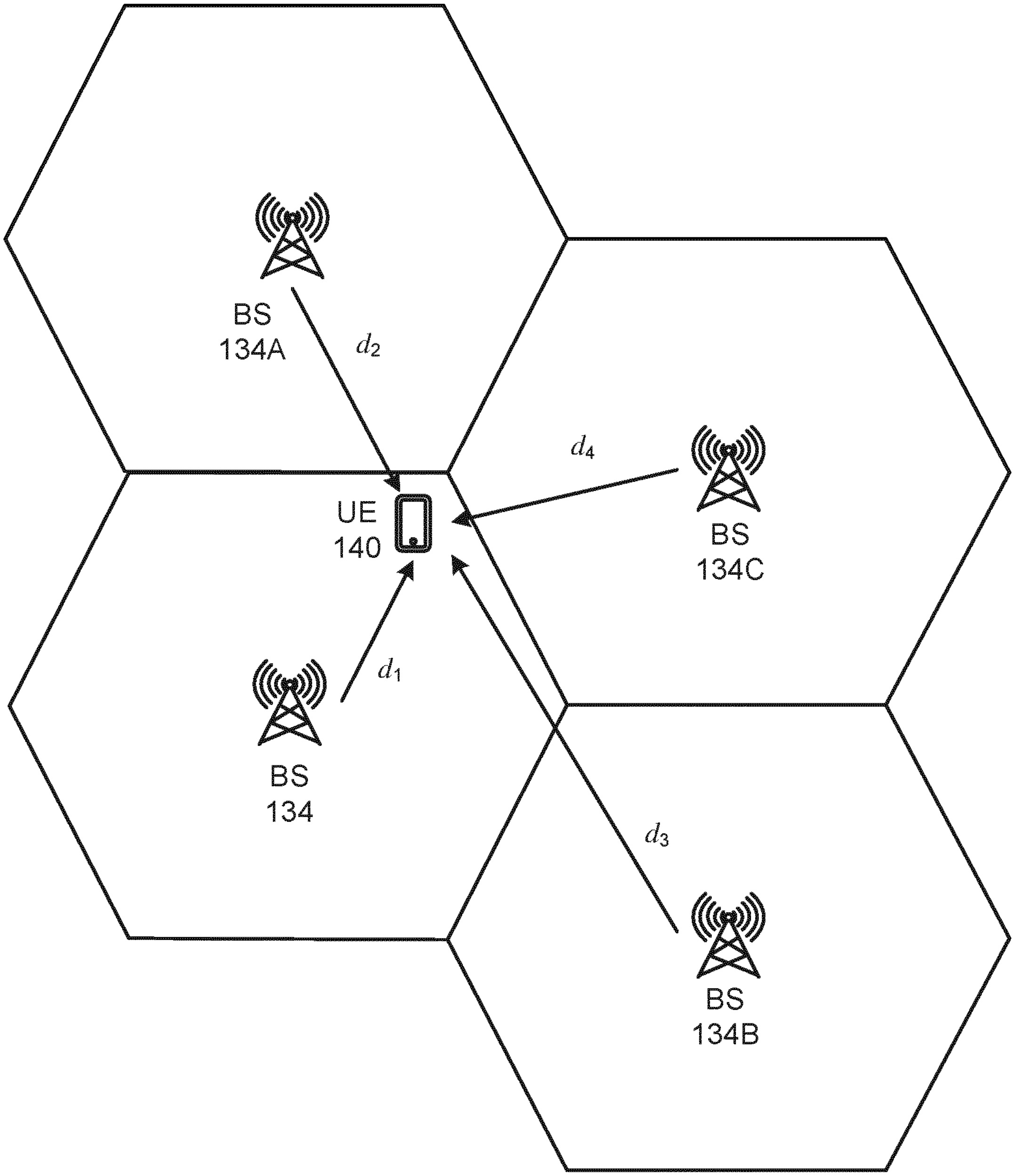
FIG. 3 is a network diagram showing distances between the user equipment and base stations according to an example embodiment.

FIG. 3 is a network diagram showing distances d1, d2, d3, d4 between the user equipment 140 and base stations 134, 134A, 134B, 134C according to an example embodiment. The base stations 134A, 134B, 134C may have similar features and/or functionalities to the base station 134.

The delay, and/or time of arrival, from a neighbor cell, which can indicate the difference between the delay from a neighbor base station 134A, 134B, 134C and the serving base station 134, can be equal to the difference between the distances from the user equipment 140 to the neighbor base station 134A, 134B, 134C and the distance from the user equipment 140 to the base station 134, can be represented as $$T_{delay,c} = \frac{d_c - d_1}{c} + T_{delay,1}$$

where $d_c$ represents the distance from the user equipment 140 to the neighbor base station 134, c is the speed of light, and $T_{delay,1}$ represents the delay between the user equipment 140 and the serving base station 134. The phase rotation, for purposes of estimating the time of arrival from a neighbor base station 134A, 134B, 134C and/or a base station 134A, 134B, 134C in a neighbor cell, can be considered to be between zero (0) and pi (Π), because the distance from the neighbor base station 134A, 134B, 134C to the user equipment 140 is greater than the distance from the serving base station 134 to the user equipment 140.

A phase wrapping solution for estimating time of arrival can include performing the frequency-domain time of arrival estimation as described above; if the phase is out of the range from zero (0) to pi (Π), rotating the raw channel estimates with the $T_{max}$ configuration, and repeating performing the frequency-domain time of arrival estimation; adding, to the final time of arrival estimate, a number of periods, as follows:

$$T_{ToA} = W \times T_{max} + T_{delay}$$

where $T_{delay}$ was measured and calculated above, W is the number of periods estimated by the user equipment and/or base station, and $T_{max}$ is the time of each period and/or inverse of the frequency; and store the number of periods W or distance wrapping time for subsequent time of arrival calculations.

Figure 4:
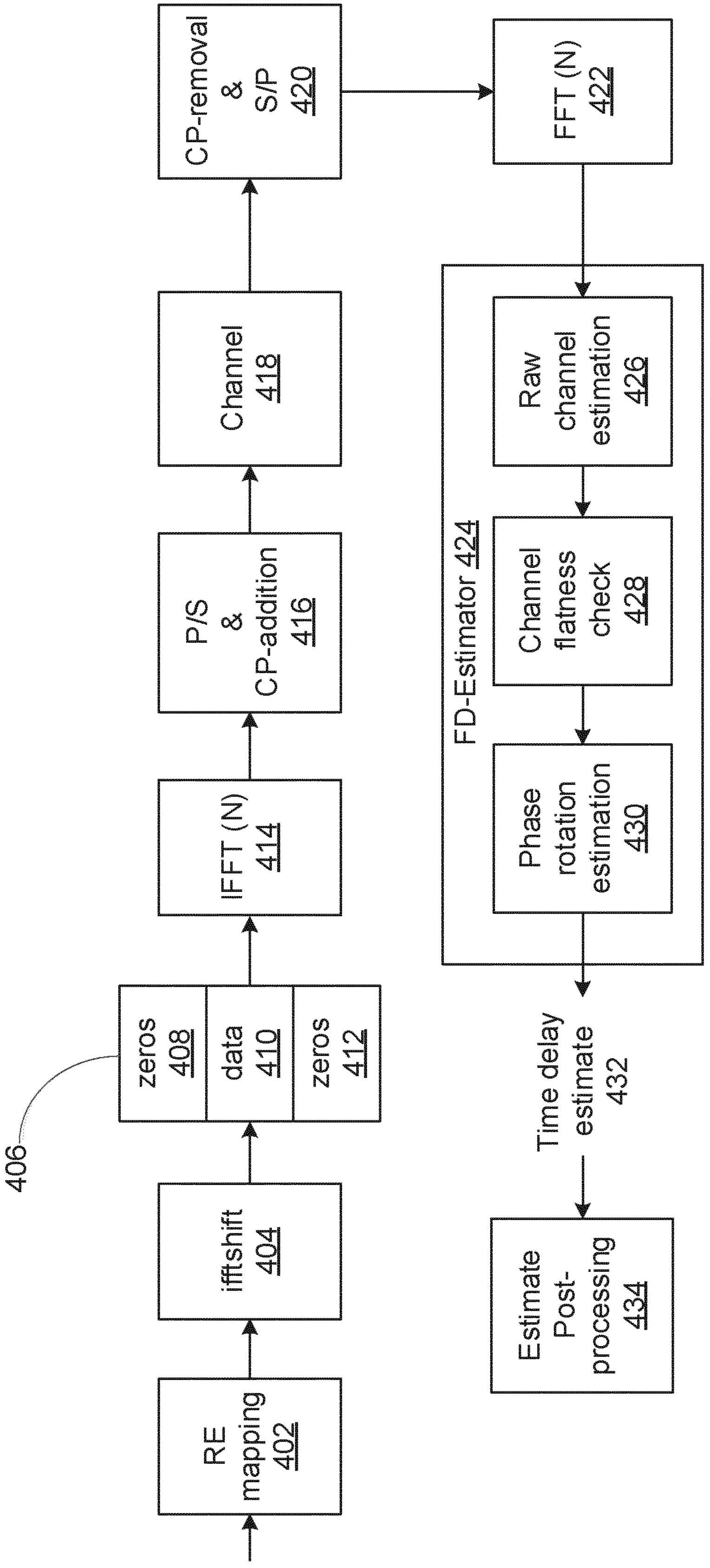
FIG. 4 shows a pipeline for time of arrival estimation in a frequency domain according to an example embodiment.

FIG. 4 shows a pipeline for time of arrival estimation in a frequency domain according to an example embodiment. The processes, methods, and/or functions of the pipeline can be performed by either the user equipment 140 or the base station 134, which will be referred to as the, "device."

The device can perform RE mapping (402). The RE mapping (402) can include determining the range of the maximum time delay estimate depending on $S_{max}$ of the PRS allocation.

The device can perform an inverse fast Fourier transform shift (ifftshift) (404). The inverse fast Fourier transform shift (404) can include transforming the received signal into a data block 406. The data block 406 can include data 410 and zeroes 408, 412.

The device can perform an inverse fast Fourier transform (IFFT(N)) (414) on the data 410. The device can perform the inverse fast Fourier transform (414) based on the following equation:

$$S(t) = \sum_{i=1}^{N} e^{j2\pi i \frac{n}{N} t}$$

The device can perform power-to-signal (P/S) and channel protocol (CP) addition (416). The power-to-signal and channel protocol addition (416) can include determining a channel value x(n) based on the following equation:

$$x(\eta) = S(\eta T R_s) = \sum_{i=1}^{N} X(i) e^{j2\pi i \frac{n}{N}}$$

The result of the performing power-to-signal (P/S) and channel protocol (CP) addition (416) can be treated as the channel (418). The device can remove the channel protocol (CP) and power-to-signal (S/P) from the channel (420). The device can then perform a fast Fourier transform (FFT(N)) (422) on the reulting channel.

A frequency-domain estimator 424 included in the device can then determine the time delay and/or time of arrival of the signal, representing the time the signal takes to travel between the user equipment 140 and the base station 134. The frequency-domain estimator 424 included in the device can perform raw channel estimation (426). The raw channel estimation (426) can include obtaining raw channel estimates $\hat{h}_{raw,n,k}$ in the frequency domain as described above.

The frequency-domain estimator 424 included in the device can perform a channel flatness check (428). The channel flatness check (428) can include setting a channel flatness flag based on counting the number of times a peak or range of the channel fading exceeds a channel threshold $H_{Threshold}$, as described above.

The frequency-domain estimator 424 included in the device can perform a phase rotation estimation (430). The phase rotation estimation (430) can include computing the autocorrelation matrix $R_m$ and determining the phase rotation $\theta_{PRS}$ in the frequency domain, as described above.

After determining the time delay estimate (432) based on the raw channel estimation (426), channel flatness check (428), and phase rotation estimation (430), the device can perform estimate post-processing (434). The estimate post-processing (434) can include performing phase wrapping to remove phase ambiguity from the range of the phase-based time of arrival estimation, as described above.

Figure 5:
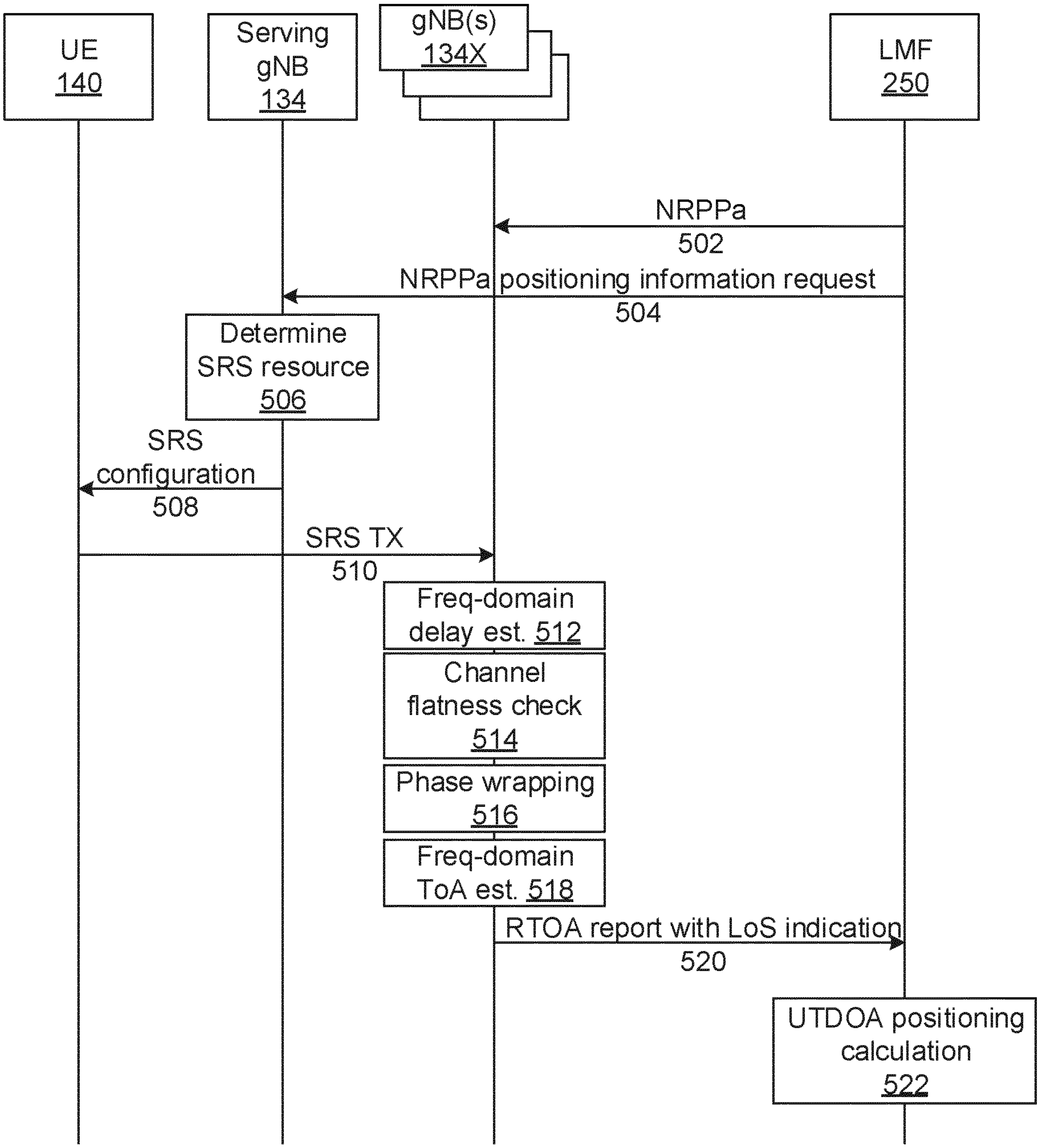
FIG. 5 is a timing diagram showing signals sent between the user equipment, base stations, and location management function according to an example embodiment.

FIG. 5 is a timing diagram showing signals sent between the user equipment 140, base stations 134, 134X, and location management function (LMF) 250 according to an example embodiment. The base stations 134X can represent any of the base stations 134A, 134B, 134C described above. In this example, one or more of the neighbor base stations 134X determines the time of arrival.

In this example, the LMF 250 can send New Radio Positioning Protocol A (NRPPa) time of arrival assistance information (502) to the neighboring base stations 134X to implement the phase wrapping procedure. The NRPPa time of arrival assistance information (502) can include an approximate distance and/or time. The LMF 250 can also send, to the serving base station 134, an NRPPa positioning information request (504).

The serving base station 134 can determine the sounding reference signal resources (506). The serving base station 134 can send, to the user equipment 140, a sounding reference signal configuration (508). The user equipment 140 can send, to one or more of the neighbor base stations 134, one or more sounding reference signal transmissions (510).

After receiving the sounding reference signal transmission(s) (510), the neighbor base station 134X can determine the frequency-domain delay estimate (512). In some examples, determining the frequency-domain delay estimate (512) can include obtaining raw channel estimates $\hat{h}_{raw,n,k}$ in the frequency domain as described above. The neighbor base station 134X can perform a channel flatness check (514), such as by setting a channel flatness flag based on counting the number of times a peak or range of the channel fading exceeds a channel threshold $H_{Threshold}$, as described above. The neighbor base station 134X can perform phase wrapping (516), such as by computing the autocorrelation matrix $R_m$ and determining the phase rotation $\theta_{PRS}$ in the frequency domain, as described above. The neighbor base station 134X can estimate the frequency-domain time of arrival (518), removing phase ambiguity from the range of the phase-based time of arrival estimation, as described above. The neighbor base station 134X can send a rotated time of arrival (RTOA) report, with a line-of-sight indication (520), to the LMF 250. Based on the received RTOA report (520), the LMF 250 can calculate an uplink time difference-of-arrival (UTDOA) position of the user equipment 140 (524).

Figure 6:
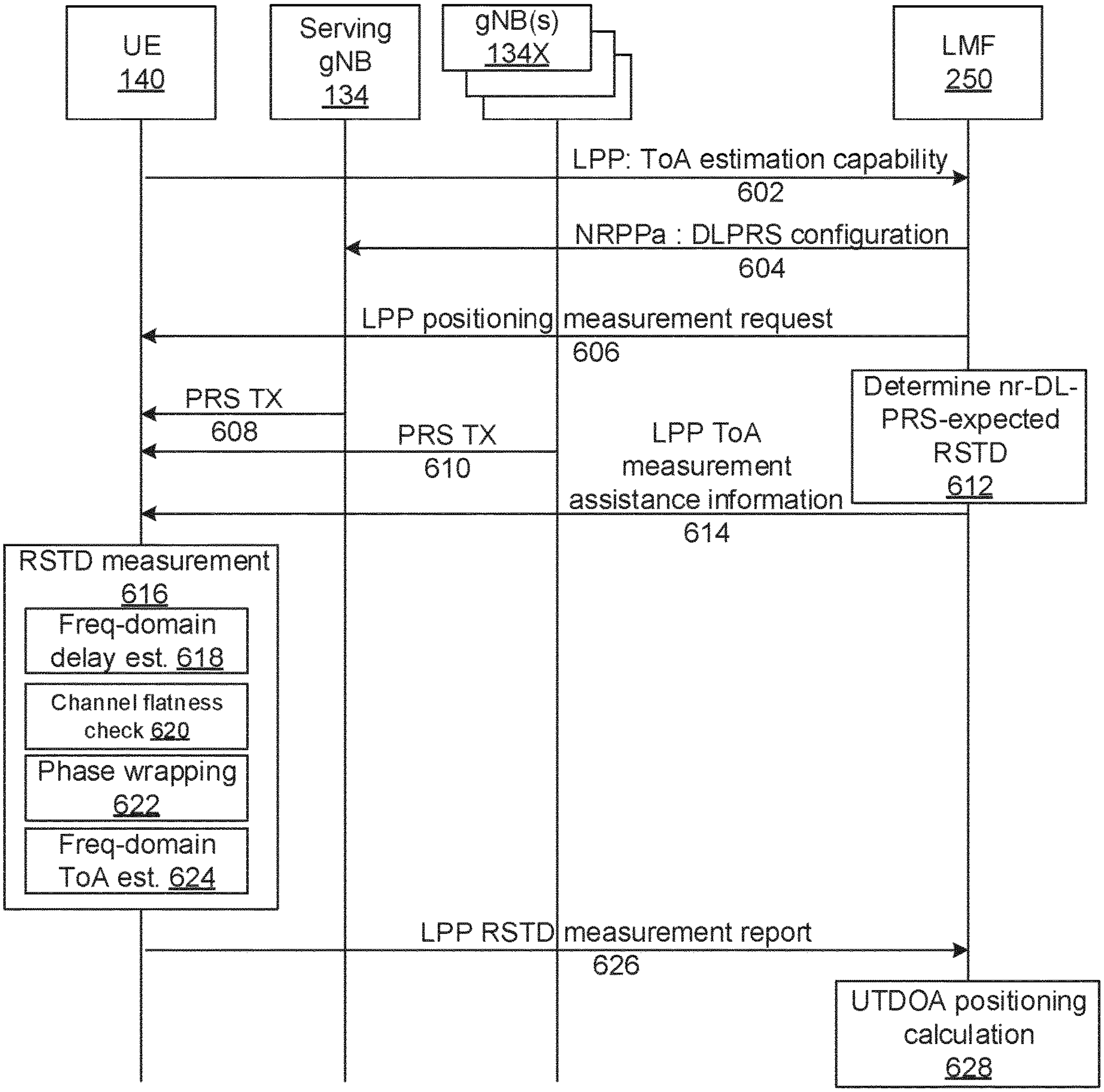
FIG. 6 is a timing diagram showing signals sent between the user equipment, base stations, and location management function according to another example embodiment.

FIG. 6 is a timing diagram showing signals sent between the user equipment 140, base stations 134, 134X, and location management function 250 according to another example embodiment. In this example, the user equipment 140 determines the time of arrival.

The LMF 250 can send, to the user equipment 140, the LTE positioning protocol (LPP) and/or an estimation of the time of arrival in the frequency domain (602). In some examples, the user equipment 140 may have sent to the LMF 250, before the LMF sends the LPP and/or estimation of the time of arrival (602), a message indicating that the user equipment 140 is configured to perform low-complexity time-of-arrival estimation. The user equipment 140 can use the estimation in the phase wrapping to remove ambiguity of the time of arrival. The LMF 250 can also send, to the serving base station 134, NRPPa downlink positioning reference signal (DL PRS) (604) configuration information. The NRPPa DL PRS can help the serving base station 134 find, and/or schedule communications with, the user equipment 140. The LMF 250 can also send, to the user equipment 140, an LPP positioning measurement request (606), requesting the user equipment 140 to determine the time of arrival for signals transmitted between the user equipment and the serving base station 134 and/or neighbor base station(s) 134X.

The serving base station 134 can send a positioning reference signal (PRS) transmission (608) to the user equipment 140. One or more of the neighbor base stations 134X can send a PRS transmission (610) to the user equipment 140. The LMF 250 can determine a New Radio (NR) DL PRS expected reference signal time difference measurement (RSTD) (612). The NR DL PRS expected RSTD can be an expected time of arrival that resolves phase ambiguities. The LMF 250 can send the determined NR DL PRS expected RSTD (614) to the user equipment 140.

After receiving the PRS TX(s) 608, 610 and/or the NR DL PRS expected RSTD (614), the user equipment 140 can perform the RSTD measurement (616). The user equipment 140 can perform the RSTD measurement (616) to determine the time of arrival of signals sent between the user equipment 140 and the serving base station 134 and/or neighbor base station(s) 134X.

The RSTD measurement (616) can include determining the frequency-domain delay estimate (618). In some examples, determining the frequency-domain delay estimate (618) can include obtaining raw channel estimates $\hat{h}_{raw,n,k}$ in the frequency domain as described above. The RSTD measurement (616) can also include performing a channel flatness check (620), such as by setting a channel flatness flag based on counting the number of times a peak or range of the channel fading exceeds a channel threshold $H_{Threshold}$, as described above. The RSTD measurement (616) can also include performing phase wrapping (622), such as by computing the autocorrelation matrix $R_m$ and determining the phase rotation $\theta_{PRS}$ in the frequency domain, as described above. The RSTD measurement (616) can also include estimating the frequency-domain time of arrival (624), removing phase ambiguity from the range of the phase-based time of arrival estimation, as described above. The user equipment 140 can send a rotated time of arrival (RTOA) report, such as an LTE positioning protocol (LPP) RTOA report (626), to the LMF 250. Based on the received RTOA report (616), the LMF 250 can calculate an observed time difference of arrival (OTDOA) position of the user equipment 140.

Figure 7:
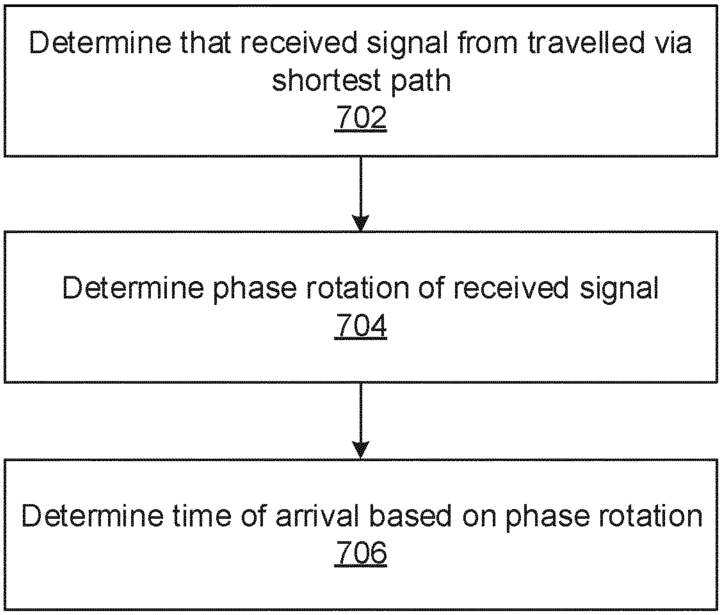
FIG. 7 is a flowchart of a method according to an example embodiment.

FIG. 7 is a flowchart of a method according to an example embodiment. The method can include determining that a received signal traveled via a shortest path from a transmitting device to a receiving device of an orthogonal frequency-divisional multiplexing (OFDM) communication system (702). The method can also include determining a phase rotation of the received signal (704). The method can also include determining a time of arrival based on the determined phase rotation (706).

In some examples, the determination that the received signal traveled via the shortest path can be based on determining that the received signal is received via a channel that exhibits flat fading in a frequency domain.

In some examples, the determination that the received signal traveled via the shortest path can be based on determining that a number of ranges of an amplitude of the received signal, in a frequency domain, that exceed a channel threshold, is less than a flatness threshold.

In some examples, the determination that the received signal traveled via the shortest path can be based on determining that a number of peaks of an amplitude of the received signal, in a frequency domain, that exceed a channel threshold, is less than a flatness threshold.

In some examples, the determination that the received signal traveled via the shortest path can include determining raw channel estimates in a frequency domain for multiple signals, the multiple signals including the received signal.

In some examples, the determination of the phase rotation can include computing an autocorrelation matrix of the raw channel estimates.

In some examples, the determination of the phase further can include determining a phase rotation of the autocorrelation matrix.

In some examples, the determination of the time of arrival can be performed for multiple OFDM symbols.

In some examples, the determination of the time of arrival can be performed by dividing the phase rotation by a subcarrier(s) spacing between positioning reference signal (PRS) resource elements.

In some examples, a maximum range of a time of arrival estimation can be based on the determined phase rotation and a subcarrier spacing.

In some examples, the determination of the time of arrival can be based on the determined phase rotation and a predetermined estimate of the time of arrival.

In some examples, the predetermined estimate of the time of arrival can be an integer number that approximates a final time of arrival as a multiple of a maximum range of the time of arrival estimation.

In some examples, the predetermined estimate of the time of arrival can be provided to the receiving device by a location management function (LMF), and the final time of arrival value can be calculated based on the predetermined estimate of the time of arrival and the determined phase rotation.

In some examples, the method can further include sending, by the receiving device to a location management function, a flat channel flag report.

In some examples, the transmitting device can include a base station, and the receiving device can include a user equipment.

In some examples, the method can further include sending, from the user equipment or the base station, to a location management function (LMF), a message indicating that the user equipment or base station is configured to perform low-complexity time-of-arrival estimation.

In some examples, the transmitting device can include a user equipment; and the receiving device can include a base station.

Figure 8:
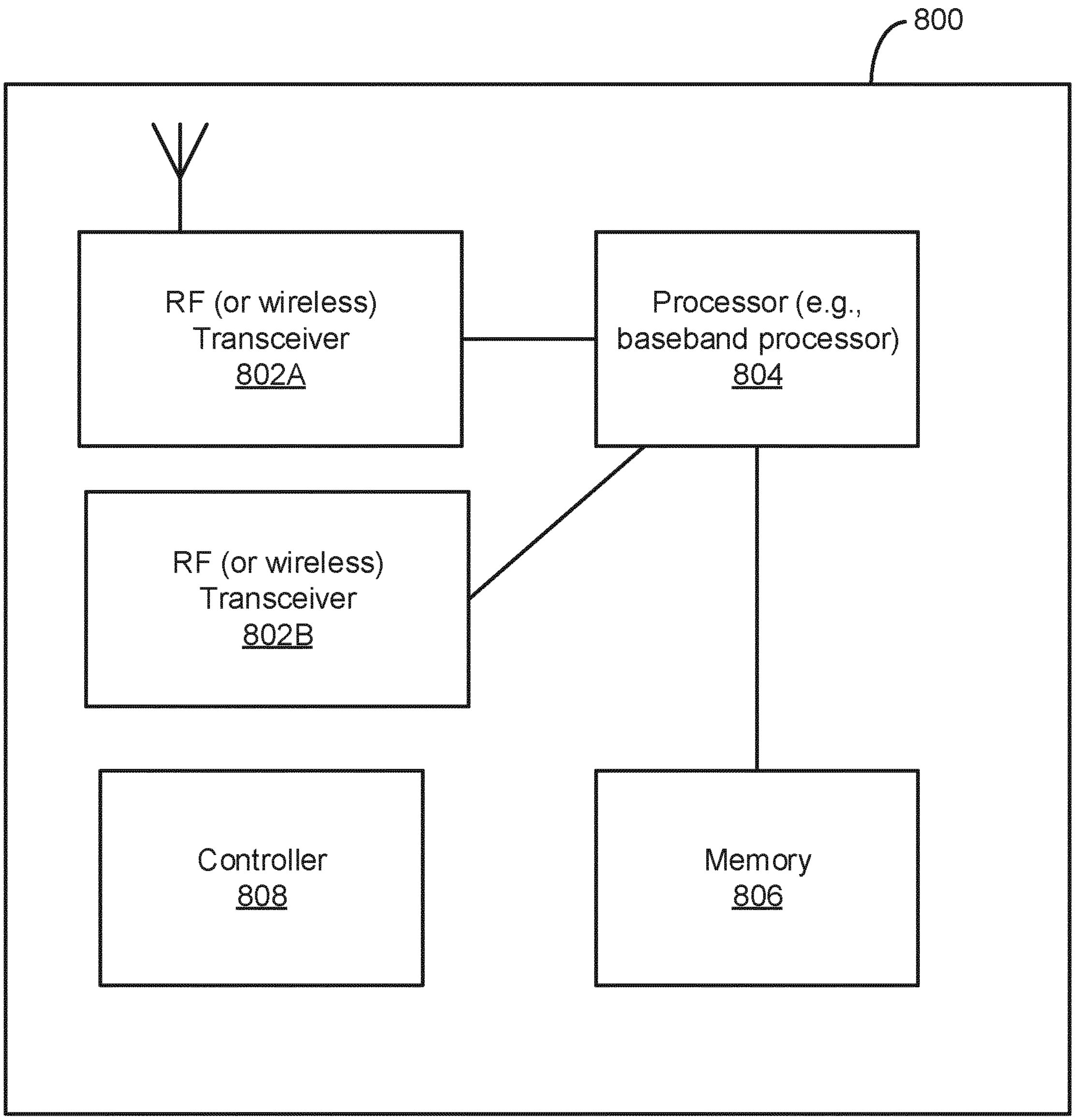
FIG. 8 is a block diagram of a wireless station according to an example embodiment.

FIG. 8 is a block diagram of a wireless station 800 according to an example embodiment. The wireless station 800 can be an example of the user equipment 140, one of the base stations 134, 134X, or the LMF 250. The wireless station 800 may include, for example, one or more (e.g., two as shown in FIG. 8) RF (radio frequency) or wireless transceivers 802A, 802B, where each wireless transceiver includes a transmitter to transmit signals and a receiver to receive signals. The wireless station 800 also includes a processor or control unit/entity (controller) 804 to execute instructions or software and control transmission and receptions of signals, and a memory 806 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium, such as a memory 806 may be provided that includes stored instructions, which when executed by a controller or processor may result in the processor 804, or other controller or processor, performing one or more of the functions or tasks described above. The memory 806 can include a non-transitory computer-readable storage medium comprising instructions stored thereon that, when executed by the processor 804, are configured to cause the wireless station 800 to perform an combination of the methods, functions, tasks, and/or processes described herein.

According to another example embodiment, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus comprising:

a processor; and a memory comprising computer executable instructions that, when executed by the processor, cause the apparatus to perform the following operations:

obtaining raw channel estimates in a frequency domain for a received positioning reference signal transmitted in an orthogonal frequency-division multiplexing (OFDM) system;

determining that the received positioning reference signal traveled via a shortest path by performing a channel flatness test in the frequency domain, wherein the channel flatness test comprises counting a number of peaks or amplitude ranges of the raw channel estimates that exceed a channel threshold, and determining that the received positioning reference signal corresponds to the shortest path when the counted number is less than a flatness threshold;

selecting the received positioning reference signal as a flat channel based on the channel flatness test;

determining a phase rotation of the flat channel by computing an autocorrelation of the raw channel estimates across multiple frequency separations and deriving a frequency-domain phase rotation from the autocorrelation; and determining a time of arrival of the received positioning reference signal by dividing the determined phase rotation by a subcarrier spacing of the OFDM system.

2. The apparatus of claim 1, wherein performing the channel flatness test comprises counting a number of frequency-domain amplitude ranges of the raw channel estimates whose magnitudes exceed a predefined channel threshold.

3. The apparatus of claim 2, wherein the channel is determined to be the flat channel when the counted number of frequency-domain amplitude ranges is less than a flatness threshold.

4. The apparatus of claim 3, wherein the flat channel is treated as a line-of-sight channel corresponding to a shortest propagation path between the transmitting device and the receiving device.

5. The apparatus of claim 4, wherein computing the autocorrelation comprises computing autocorrelation values for multiple frequency separations across a plurality of orthogonal frequency-division multiplexing (OFDM) resource elements.

6. The apparatus of claim 5, wherein determining the phase rotation comprises deriving the phase rotation from a product of autocorrelation values across frequency separations up to a maximum separation value (Smax).

7. The apparatus of claim 6, wherein the time of arrival is determined relative to a beginning of a fast Fourier transform (FFT) window at the apparatus.

8. The apparatus of claim 7, wherein determining the time of arrival further comprises performing phase wrapping to resolve phase ambiguity based on a predetermined estimate of the time of arrival.

9. The apparatus of claim 8, wherein the predetermined estimate of the time of arrival comprises an integer multiple of a maximum time-delay range derived from the maximum separation value (Smax) and a subcarrier spacing.

10. The apparatus of claim 9, wherein the computer-executable instructions further cause the apparatus to perform the following operations: transmitting, to a location management function, a report indicating the determined time of arrival and an indication that the flat channel corresponds to a line-of-sight path.

11. A method performed by an apparatus, the method comprising:

obtaining raw channel estimates in a frequency domain for a received positioning reference signal transmitted in an orthogonal frequency-division multiplexing (OFDM) system;

determining that the received positioning reference signal traveled via a shortest path by performing a channel flatness test in the frequency domain, wherein the channel flatness test comprises counting a number of peaks or amplitude ranges of the raw channel estimates that exceed a channel threshold, and determining that the received positioning reference signal corresponds to the shortest path when the counted number is less than a flatness threshold;

selecting the received positioning reference signal as a flat channel based on the channel flatness test;

determining a phase rotation of the flat channel by computing an autocorrelation of the raw channel estimates across multiple frequency separations and deriving a frequency-domain phase rotation from the autocorrelation; and determining a time of arrival of the received positioning reference signal by dividing the determined phase rotation by a subcarrier spacing of the OFDM system.

12. The method of claim 11, wherein performing the channel flatness test comprises counting a number of frequency-domain amplitude ranges of the raw channel estimates whose magnitudes exceed a predefined channel threshold.

13. The method of claim 12, wherein the channel is determined to be the flat channel when the counted number of frequency-domain amplitude ranges is less than a flatness threshold.

14. The method of claim 13, wherein the flat channel is treated as a line-of-sight channel corresponding to a shortest propagation path between the transmitting device and the receiving device.

15. The method of claim 14, wherein computing the autocorrelation comprises computing autocorrelation values for multiple frequency separations across a plurality of orthogonal frequency-division multiplexing (OFDM) resource elements.

16. The method of claim 15, wherein determining the phase rotation comprises deriving the phase rotation from a product of autocorrelation values across frequency separations up to a maximum separation value (Smax).

17. The method of claim 16, wherein the time of arrival is determined relative to a beginning of a fast Fourier transform (FFT) window at the apparatus.

18. The method of claim 17, wherein determining the time of arrival further comprises performing phase wrapping to resolve phase ambiguity based on a predetermined estimate of the time of arrival.

19. The method of claim 18, wherein the predetermined estimate of the time of arrival comprises an integer multiple of a maximum time-delay range derived from the maximum separation value (Smax) and a subcarrier spacing.

20. The method of claim 19, further comprising transmitting, to a location management function, a report indicating the determined time of arrival and an indication that the flat channel corresponds to a line-of-sight path.

* * * * *